(12) United States Patent
Humphris (10) Patent No.: US 8,528,110 B2
(45) Date of Patent: Sep. 3, 2013

(54) PROBE DETECTION SYSTEM

(75) Inventor: Andrew Humphris, Oxfordshire (GB)

(73) Assignee: Infinitesima Ltd., Oxfordshire (GB)

( * ) Notice: Subject to any disclaimer, the term of this patent is extended or adjusted under 35 U.S.C. 154(b) by 199 days.

(21) Appl. No.: 12/996,512

(22) PCT Filed: Jun. 8, 2009

(86) PCT No.: PCT/GB2009/050637
§ 371 (c)(1),
(2), (4) Date: Feb. 16, 2011

(87) PCT Pub. No.: WO2009/147450
PCT Pub. Date: Dec. 10, 2009

(65) Prior Publication Data
US 2011/0167525 A1  Jul. 7, 2011

(30) Foreign Application Priority Data

Jun. 6, 2008 (GB) .................................. 0810389.7
Dec. 10, 2008 (GB) .................................. 0822505.4

(51) Int. Cl.
*G01Q 20/02* (2010.01)
(52) U.S. Cl.
USPC ................ 850/6; 850/1; 850/2; 850/3; 850/4; 850/5; 850/7; 356/28.5; 356/450
(58) Field of Classification Search
USPC ................. 850/1, 2, 3, 4, 5, 7; 356/28.5, 450
See application file for complete search history.

(56) References Cited

U.S. PATENT DOCUMENTS

| 5,144,150 A | 9/1992 | Yoshizumi et al. |
| 6,678,056 B2 | 1/2004 | Downs |
| 2002/0015153 A1 | 2/2002 | Downs |
| 2004/0020279 A1* | 2/2004 | Degertekin et al. ............. 73/105 |
| 2007/0234786 A1* | 10/2007 | Moon ............................. 73/105 |
| 2011/0138506 A1 | 6/2011 | Humphris |

FOREIGN PATENT DOCUMENTS

| EP | 0422548 | 4/1991 |
| EP | 1892727 | 2/2008 |
| EP | 2017599 | 1/2009 |
| WO | 02063368 | 8/2002 |
| WO | 2004005844 | 1/2004 |
| WO | 2005008679 | 1/2005 |

OTHER PUBLICATIONS

Erlandsson et al., "Automatic Force Microscopy using Optical Interferometry," J. Vac. Sci. Technol. A 6 (2), Mar./Apr. 1988, 266-270.
Howard-Knight et al., "Video rate atomic force microscopy using low stiffness, low resonant frequency cantilevers," Appl. Phys. Lett 93, 104101 (2008).

* cited by examiner

*Primary Examiner* — Nicole Ippolito
(74) *Attorney, Agent, or Firm* — Volpe and Koenig, P.C.

(57) ABSTRACT

A probe detection system (74) for use with a scanning probe microscope comprises both a height detection system (88) and deflection detection system (28). As a sample surface is scanned, light reflected from a microscope probe (16) is separated into two components. A first component (84) is analysed by the deflection detection system (28) and is used in a feedback system that maintains the average probe deflection substantially constant during the scan. The second component (86) is analysed by the height detection system (88) from which an indication of the height of the probe above a fixed reference point, and thereby an image of the sample surface, is obtained. Such a dual detection system is particularly suited for use in fast scanning applications in which the feedback system is unable to respond at the rate required to adjust probe height between pixel positions.

30 Claims, 7 Drawing Sheets

*Figure 1*

Prior Art

PROBE DETECTION SYSTEM

This invention relates to the field of probe microscopy and, in particular, to a detection system used to monitor the position of a microscope probe in relation to a sample surface.

The principle behind the scanning probe microscope (SPM) is to carry out a mechanical scan over a sample surface with a nanometric probe tip in order to produce an image of the sample. Features within the image result from variations in an interaction between the tip and the sample.

A particular example of the SPM is the atomic force microscope (AFM) in which the force interaction between the sample and the sharp tip of a probe is monitored. The probe of a typical AFM includes a very small cantilever that is fixed to a support at its base and with the tip at its opposite (free) end. When the probe tip is brought into close proximity with the sample, an interaction force develops between sample and tip. If the tip is in motion, for example oscillating, the interaction force will modify this motion in some way. If the tip is static, the force will displace the tip relative to the sample surface.

During the course of a scan, the strength of the interaction between tip and sample surface will change as the characteristics of the surface beneath the probe tip change. A three axis high-resolution scanner typically generates relative motion between the sample and the probe, driving either the sample and/or probe support. The effect of the interaction force on either the position and/or motion of the probe tip is monitored during the course of the scan. In standard AFM operation, the strength of the interaction force is held constant. That is, its effect on the probe is observed and a feedback system operates to adjust the separation of the sample and the base of the probe in response to any change so as to return the observed parameter to a predetermined value, the set point. Data associated with this adjustment (conventionally, vertical or "z" movement) is collected and may be used to construct an image of the sample across a region of its surface.

As indicated above, the adjustments made to the base—sample separation are conventionally taken to be in the vertical or _z_direction, the sample surface being scanned in the x, y plane. This convention will be followed herein although it is to be borne in mind that the microscope may be arranged such that the sample is not oriented on a horizontal surface and so the feedback adjustment is not in a vertical direction. That is, the term "vertical" is to be understood as meaning simply perpendicular to the plane of the sample, or equivalently, perpendicular to the plane in which the sample surface is scanned. Conventionally this is designated the z direction, as indicated by the cartesian axes shown in FIG. 1.

The interpretation of the image formed by the AFM will depend to some extent on the nature of the surface under investigation. Surface topography generally makes the most significant contribution to the image, the height of the sample being closely followed by the probe as it scans, but other characteristics such as surface hydrophobicity and hydrophilicity, visco-elasticity, etc. may also contribute. The probe and microscope may further be adapted to measure other sample properties, such as magnetic or electric fields, via suitable interaction forces.

AFMs may be designed to operate in a variety of imaging modes. In contact mode the probe remains in substantially continuous contact with the sample. In dynamic mode the probe is oscillated making no or intermittent contact with the sample.

If a static tip is used to probe the surface then its position during the course of a scan is monitored using the effect that the interaction force has on the bend or deflection of the cantilever. As the interaction force between tip and surface changes, the tip is either pulled towards or pushed away from the surface. This tip movement is communicated to the cantilever part of the probe, which accordingly bends or flexes along its length. The AFM in this arrangement is set to measure the deflection of the cantilever with a sensitive detector such as an optical lever system or other deflection detector as is well known in the art. Deflection, in this context, refers to the tilt of an upper surface of the probe, which is generally used to provide an indication of cantilever bend.

Alternatively, the probe may be oscillated vertically at or near one of its resonant frequencies. Variations in the sample—probe interaction affect the motion of the probe. In particular, the amplitude, phase and resonant frequency of these oscillations may be monitored and probe—sample separation adjusted in order to maintain constant average interaction.

Regardless of their mode of operation, AFMs can be used to obtain images on an atomic scale of a wide variety of samples in a range of environments (air, liquid or vacuum). Typically, they employ piezoelectric actuators, optical lever deflection detectors and very small cantilevers produced using silicon fabrication techniques. Their high resolution and versatility has led to their finding application in diverse fields such as industrial inspection, semiconductor manufacturing, biological research, materials science and nanolithography.

The terms "probe", "tip" and "cantilever" are often used interchangeably in the field, but for the purpose of this description, the terms require more rigorous definition. The tip (or, if it better suits the context, the probe tip) refers to the 3 dimensional, often conical or pyramidal structure that is located at the free end of the cantilever beam. The tip tapers to a point that is its closest point of interaction with a surface under interrogation. The cantilever is the beam itself, excluding the tip, that supports the tip at one end and at the other is held by the microscope apparatus. The cantilever and tip together are referred to as the probe.

Figure 1:
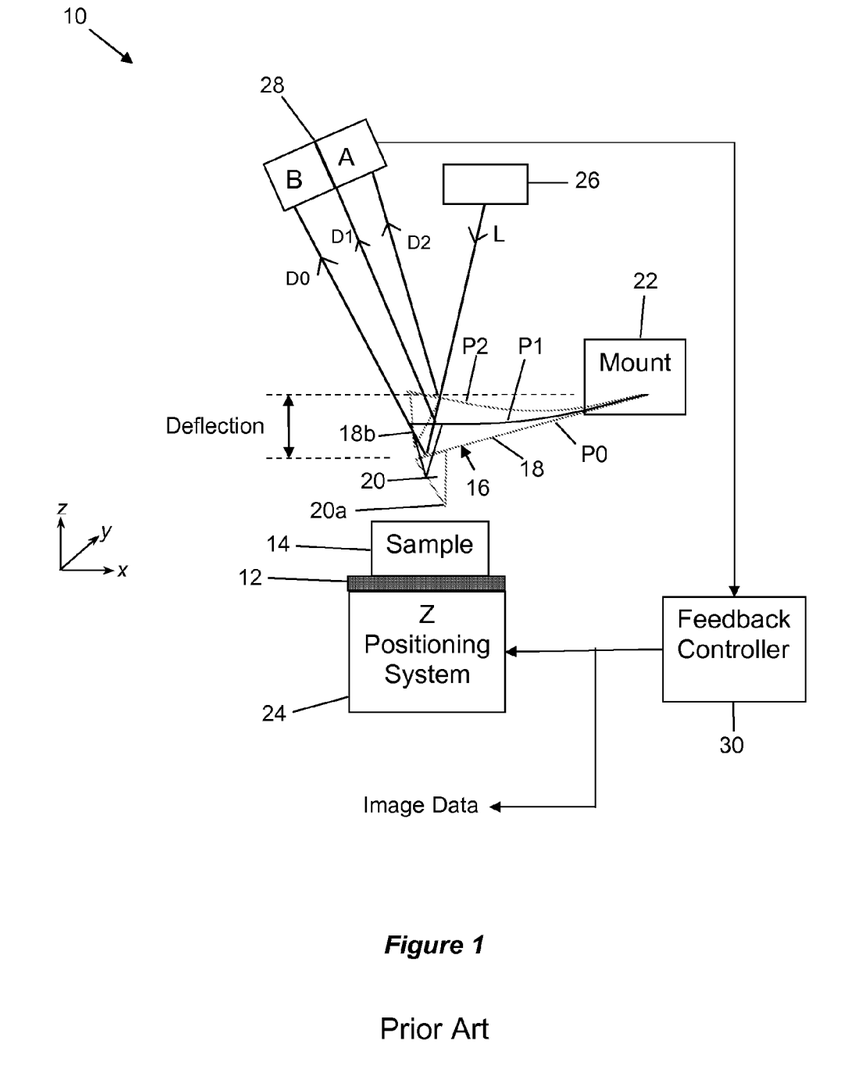
FIG. 1 is a schematic illustration of the components of a prior art atomic force microscope showing a typical deflection detection system.

FIG. 1 illustrates the basic components of a conventional AFM 10. This prior art AFM 10 comprises a moveable stage 12 on which a sample 14 to be investigated by a probe 16 is mounted. The probe 16 comprises a cantilever beam 18 and a tip 20, which tapers to a fine point 20a, and which is located towards one end of the cantilever beam 18. The other end of the cantilever beam 18 is fixed to a mount 22. A z-positioning system 24, comprising piezoelectric drivers that are operable to move the stage 12 towards and away (z-direction) from the probe 16 is connected to the stage 12. Further drivers (not shown) are connected to either the mount 22, the stage 12 or both and are operable to provide relative motion between the sample 14 and probe 16 in the plane (x,y) of the sample. A light source 26 is arranged to emit a beam L which is directed onto an upper surface (back) 18b of the cantilever beam 18 at the position at which the tip 20 is mounted. Light reflected from the back 18b of the cantilever propagates to a position sensitive detector (PSD), typically a split photodiode 28, and a feedback signal is generated. The output of detector 28 is connected via a feedback controller 30 to the z-positioning system 24.

The feedback signal from the PSD may be processed to extract quantities such as probe deflection, amplitude, phase or other parameters. For simplicity, this prior art AFM will be described as operating in contact mode using feedback based on probe deflection.

The probe 16 is generally (for AFM) fabricated from silicon or silicon nitride. Typically, the cantilever 18 is around 100-200 µm long, 20-50 µm wide and around 0.5 µm thick, but this size can of course be varied according to application.

The shape may also be varied: typically it is rectangular or triangular with, in the latter case, the tip 20 at its apex. The tip 20 is typically 5 μm at its base, 3-10 μm high and with an end radius of curvature of 10-20 nm. In use, the fine point 20a at the end of the tip 20 is oriented towards the sample.

In taking an image of the sample, the prior art AFM 10 operates as follows. Using the z-positioning system 24, the tip 20 is first moved towards the sample 14 until the cantilever 18 deflects to a predetermined level. This predetermined degree of cantilever 18 deflection, for example that indicated in FIG. 1 by probe outline P1, is the set point for the feedback controller 30.

The deflection of the cantilever 18 is monitored using the light beam L and the detector 28. The detector 28 is split across its length into independent detector areas A and B. The output signal from the detector is the difference between the intensity of light illuminating area A to that illuminating area B. The intensity difference output from the detector therefore provides an indication of cantilever deflection. The detector 28 is positioned such that when the cantilever 18 is bent to position P1 (the set point), light beam L incident on the back 18b of the cantilever, is reflected along path D1 and is incident substantially equally on areas A and B. That is $I_A - I_B \sim 0$, where $I_A$ and $I_B$ represent the intensity of light illuminating areas A and B respectively. The exact value of $I_A - I_B$ can be adjusted and this value is used to identify the deflection set point position.

The tip 20 is now scanned across the surface of the sample 14, usually following a raster pattern. When the tip 20 encounters a part of the surface with increased height, the tip 20, which traces the surface, is forced further upwards. This, in turn, causes the probe 16 to increase its flexion to, for example, position P2. With the probe 16 in this position, the angle of incidence between light beam L and the surface defined by the back 18b of the cantilever is varied. Light beam L is accordingly reflected along a different path D2 and is therefore incident more fully on area A of the detector than area B. That is, the intensity difference $I_A - I_B$ between light incident on the two parts of the detector 28 has changed from its previous (set point) value. It can therefore be seen that the value of the intensity difference provides an indication of the deflection of the cantilever and, importantly, an indication as to how far it has been deflected from its set point. The feedback controller 30 is set to adjust the vertical position of the probe mount 22 to move it away from the sample 14 and so to return the deflection signal received from the detector 28 to its set point ($I_A - I_B \sim 0$ in the example given). The probe 20 is accordingly maintained in the orientation shown as P1.

Conversely, when the tip 20 encounters a part of the surface with decreased height, the bias on the cantilever beam 18 that results from its set-point bending pushes the tip 20 downwards. The probe 16 will therefore reduce its flexion and adopt an orientation such as that indicated by P0. With this orientation, the angle of incidence between of light beam L on the back 18b of the cantilever is such that the beam L is reflected along path D0. Area B of the detector is accordingly illuminated more fully than area A. The feedback controller 30 again adjusts the vertical position of the probe mount 22 to move it towards the sample 14 and so to maintain the deflection signal at its set point. The probe 20 is accordingly maintained in the orientation shown as P1.

In this way, the feedback of the microscope system ensures that the deflection of the probe 16, as determined by the angle of tilt of the back 18b of the cantilever above the tip, is held substantially constant during the course of a scan. This in turn ensures that the interaction force between probe tip 20 and the sample 14, which serves to attract or repel the tip to or from the surface, is also held substantially constant. As the scan progresses, the vertical position of the mount set by the z-positioning system is measured in order to provide an indication of the height of the sample surface. The adjustments made by the z positioning system 24 during the course of a scan are used to construct the image.

Recent advances in probe microscopy have led to much faster scanning techniques with more rapid data collection times. With this new generation of microscope, such as that described in PCT patent applications WO 02/063368 and WO 2004/005844, it is however becoming increasingly apparent that constraints imposed by the AFM components themselves are limiting image collection times.

With reference to the capabilities of the prior art AFM described above, as the scanning speed is increased, three distinct regimes of AFM operation can be identified.

In the prior art AFM described above, the tip 20 is moved continuously across the sample surface to cover a set number of pixels per second. Cantilever deflection is monitored and the feedback system makes continual adjustments to the vertical separation of probe 20 and sample 14 in order to maintain the probe 16 at its preset bend orientation P1. The speed with which a change in deflection can be detected and then vertical separation adjusted in response essentially sets the upper scanning speed limit for the first (slowest) regime. In order for accurate information to be collected, the probe—sample interaction should be constant across all pixel positions. That is, the probe—sample separation must be adjusted by the feedback system over a timescale shorter than that taken by the probe to collect image data corresponding to a single pixel position. That is, before the raster scan moves the probe to a new pixel position.

As the scanning speed is increased however the AFM enters a second regime in which the feedback system has insufficient time to return the probe to its set deflection within a single pixel area. The feedback system will accordingly lag behind the data collection system and height information (obtained from the vertical adjustment) will not reflect the true height of the probe tip (and hence sample height) at the pixel position. The pixel rate must be reduced either by increasing the size of each pixel, which reduces image resolution, or by slowing the scan, with a consequent increase in data collection time.

In order to reduce the effect of this limitation, current research is being concentrated on improving the speed of the feedback system: that is, effectively extending the range of the first regime. One approach makes use of two actuators to provide movement of the cantilever in the z direction. A first actuator drives the probe assembly, with consequent limited feedback response. A second actuator is however provided that is integral with the probe and so can be operated to move only the probe. The range of movement provided by this secondary actuator is smaller than that provided by the first but, as it is used to affect only the probe, its response time is faster. In this way, an initial adjustment to tip height may be made via the fast actuator with a slower, larger adjustment following in due course. This use of nested feedback systems with integral secondary actuator has however met with limited success. This is due, in part, to the difficulty interpreting the response of the feedback systems and thus in determining the height of the tip. Without this information, surface topography (or other sample characteristic) cannot be accurately inferred.

An alternative approach is to operate the AFM in a mode permitting some variation in the deflection of the cantilever. In this mode cantilever deflection is measured and data associated with this deflection is collected and used to construct the image. Operating in this mode therefore necessitates improved measurement techniques in order to extract useful information from the probe deflection. As will be explained in more detail below, the prior art detection system as shown in FIG. 1 can be adapted to operate in this mode but such adaptation may result in a loss of metrology information, which, for many applications, is not satisfactory.

If the scanning speed is increased still further then a third regime is entered in which the prior art AFM is totally unsuitable for operation. Above a certain scanning speed, it is possible to excite transient motion of the cantilever 18. That is if, during the course of a scan, the tip encounters, for example, a higher region on the surface of the sample, the tip 20 will supply an impulse that may excite transient motion of the cantilever beam. If this transient motion is present as the probe traces a surface contour, it will perturb the orientation of the probe at any given surface position and so limit the information available from monitoring probe deflection. Deflection is no longer related in any way to probe height. This is described by J. P. Howard-Knight and J. K. Hobbs in "Video rate atomic force microscopy using low stiffness, low resonant frequency cantilevers", Appl. Phys. Lett 93 104101 (2008) and will also be explained in greater detail below.

Turning now back to the prior art system shown in FIG. 1, it is clear that as the probe tip 20 traces the surface of the sample 14, its vertical position at each point in the scan line provides a direct indication of the topography of the sample 14. Strictly therefore, measurement of the height of the point 20a of the tip above a reference level, for example the surface of the stage 12, would give a true indication of the height of the sample.

In the first scanning speed regime, the prior art system of FIG. 1 simply monitors the difference between the light intensity incident on area A and that incident on area B. No specific measurement of deflection is made; the prior art AFM is a nulling system in that it is only required to hold the deflection constant. Probe height information is obtained from the drivers that operate the feedback system to ensure constant deflection.

In moving now to the second scanning speed regime, it is clear that the prior art system could be used to measure the difference between the light intensity incident on area A and that incident on area B. That is, the AFM may be operated not as a nulling system but as a system that extracts data (intensity difference) directly as a result of its interrogation of a sample. Such data is of course only useful to the extent that information relating the height of the probe above a reference point, for example the stage surface, can be extracted from the measured deflection data.

Measurement of the intensity difference between the two parts of the detector clearly provides an indication of the direction light is reflected from the back 18b of the cantilever. The reflection direction in turn depends on the angle at which the back of the cantilever 18b is tilted. For small angles, the change in tilt is equal to the angle through which the cantilever beam 18 is rotated and is therefore proportional to the change in height at the tip 20. It is to be noted that the positions P0, P1 and P2 illustrated in FIG. 1 are greatly exaggerated in order to improve clarity and, in many situations, the cantilever beam 18 is not significantly bent and this small angle approximation is good. It is also apparent that the position at which the deflection is measured is a position on the back 18b of the cantilever beam and not the position of the point 20a of the tip. These two points are separated by an amount equal to the perpendicular height of the tip 20. For small deflections, this can be assumed constant during the course of a scan.

Regardless of these approximations, the measurement of the height of the tip 20 via its deflection has a prejudice in its support in that it is relatively straightforward to implement. In the first scanning regime it is not necessary to quantify variation of the probe deflection; it is held constant in a nulling system. Even in the second scanning regime, scanning probe microscope operation has, to date, been under conditions for which the above assumptions are valid.

Despite the apparently universal reliance on probe height measurement via its deflection, examples of direct height measurement are described in U.S. Pat. No. 5,144,150 (Yoshizumi), EP 1 892 727 (Mitutoyo) and EP 2 017 599 (Mitutoyo). The microscopes described in these documents all make use of an interferometer to extract information relating to the height of the probe.

U.S. Pat. No. 5,144,150 describes use of a contact probe to measure the configuration of a curved surface such as that of a spherical lens or a Fresnel lens or of the patterning on a semiconductor. A problem in measuring such surfaces is that unacceptable pressure may be exerted on a sample surface as, for example, the cantilever beam is bent as the probe traces a particularly high region of the surface. The solution is to ensure that the bending of the cantilever beam is held substantially constant as the sample surface is scanned. This is achieved by connecting the base of the cantilever to a so-called optical probe. The optical probe is focused on the back of the cantilever beam, above the tip. If the tip moves relative to the base (i.e. the beam bends), the tip moves away from the focal point of the optical probe. The optical probe is then moved physically so as to return the tip to its focal point and so to preserve the tip—optical probe separation. Through the connection between the optical probe and the base of the cantilever, this so-called "autofocus system" in turn ensures that the cantilever returns to its original bend configuration. In other words, an optical feedback system is used to maintain the cantilever at substantially constant deflection. To this extent, this arrangement is similar to the prior art AFM systems that operate in constant interaction mode described above.

In contrast to the constant interaction AFMs, which simply extract the z position of the probe from the vertical distance required to move the base of the cantilever to maintain deflection position, the U.S. Pat. No. 5,144,150 microscope directly measures the velocity of the back of the tip using interferometry. From this velocity information, the height of the probe at a particular point in the scan can be deduced. The velocity of the probe is measured by interference of a laser beam reflected from the back of the tip with a reference beam. The beam undergoes a Doppler frequency shift on reflection from the moving probe. This use of interferometry provides an indication of the height of the probe, independent of its deflection or that of the associated cantilever beam.

The arrangement described in U.S. Pat. No. 5,144,150 does not however overcome any of the limitations placed on scanning speed. It can be operated in the first regime only. The feedback system to maintain cantilever deflection cannot react instantly to a change in deflection and accordingly scanning speed is limited such that the time spent collecting an image pixel is greater than the response time of the autofocus feedback system. It is worth noting that this prior art system includes a second feedback system that ensures the laser beam of the interferometric system is reflected from the probe back along its incident path, regardless of the inclination of the probe. That is, the scanning speed is limited by the response time of the slower of these two systems.

The two Mitutoyo applications, EP 1 892 727 and EP 2 017 599, are concerned with improving the accuracy with which probe microscopes can be operated and hence resolution of the image. This is achieved by extracting a direct measurement of the height of the probe relative to a fixed reference point using interferometry. In one embodiment, a beam reflected from the back of the probe is interfered with a reference beam and the path difference extracted. This overcomes the problem of motion errors introduced by the scanners: the z direction motion of the probe tip arises purely from the shape of the sample surface. Any scanner error will cause the probe to bend, which cannot affect the direct height measurement.

The system described in EP 1 892 727 does not make use of any feedback system. That is, there is no adjustment made to prevent excessive bending of the probe, which is accordingly limited to scanning very flat surfaces.

EP 2 017 599 describes a development of the apparatus described in the earlier Mitutoyo application in which feedback is implemented. This feedback system is simplified in relation to the previously described feedback AFM prior art in that a single sensor is used to detect both the contact force (feedback signal) and displacement (height) of the probe. A small vertical high-frequency oscillation (dither) is imparted to the probe as it scans. The amplitude of this vibration provides information as to the strength of the interaction force. The direct height signal measured by the interferometer accordingly has a low frequency component that corresponds to the sample height variation superimposed with a high-frequency component that results from the dither. Filters are used to separate the two components in the signal processing. The height of the base of the probe is adjusted in order to maintain the amplitude of the high-frequency component constant. This arrangement does not however overcome any of the limitations placed on scanning speed. Accurate data results can only be obtained if the feedback system has sufficient time to respond to any changes in surface height. That is, if the dither amplitude is held constant between image data collection points. Data cannot be collected at a faster rate as, in the first instance, amplitude measurement requires monitoring the oscillation over a number of cycles (5-10 in this instance) and, secondly, the z driving system must be given time to adjust the probe position in order to restore the amplitude to its set value. This apparatus can therefore also only be operated in the first scanning regime.

In summary, prior art probe microscopes are either unsuitable for operation outside the first (slow) scanning regime identified above or are limited in their application to relatively flat samples.

Figure 2:
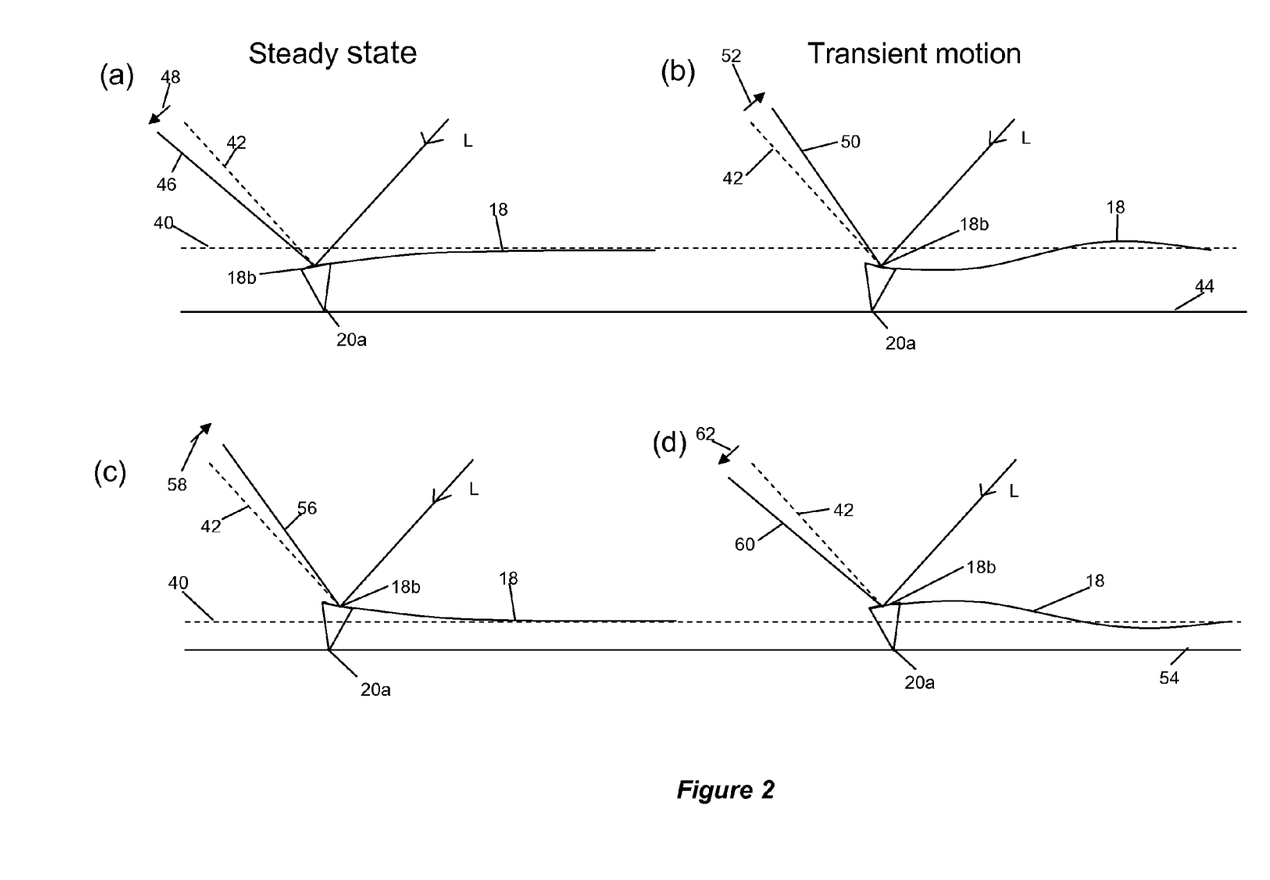
FIG. 2 is a series of examples of possible tip and cantilever orientations when imaging at scan frequencies below ((a) and (c)) and above ((b) and (d)) a threshold at which transient motion of the cantilever is observed.

The deficiencies inherent in prior art probe microscopes are further emphasised by considering the additional difficulties encountered in attempting to scan at the very high speeds of the third scanning regime. That is, if the speed is sufficient to excite transient motion of the cantilever. Such a situation occurs if the cantilever response to an impulse, given, for example, on encountering a higher region of the sample surface, is above the frequency of its first constrained resonance. Under these circumstances then, not only will the cantilever tilt at its tip probably be of a different magnitude to its steady-state (set-point) tilt, but it may also be in an opposite direction. The transient motion will vary the angle of the cantilever with position and time. The problem is illustrated with reference to FIG. 2.

Note that two possible cantilever mechanical states exist: the tip may be constrained by contact with a sample surface or it may be free. Cantilever resonance conditions in these states are termed constrained and unconstrained resonances respectively.

FIGS. 2a, b, c, d illustrate various situations in which the probe tip 20 has received an impulse from the sample 14 surface. As before, the probe 16 comprises a tip 20 connected to a cantilever beam 18. The point 20a of the probe closest to the sample and the back of the cantilever 18b that is used for deflection measurement are indicated. A steady state, nominal position of the back 18b of the cantilever is indicated by dotted line 40. By "nominal" it is meant that, if feedback was operating, this would be the position at which the back 18b is to be held. That is, equivalent to probe orientation P1 in FIG. 1. An incoming light beam L is shown to the right of each figure and, to the left, is an expected reflection direction 42, shown as a dotted line, for the probe in its nominal position. That is, dotted line 42 corresponds to D1 in FIG. 1.

In FIGS. 2a and 2b the position of the sample surface is indicated by solid line 44. This surface position 44 is effectively a trough and, for the sake of clarity of this example, the tip 20 follows the surface and is attracted downwards from its nominal position. FIG. 2a illustrates the situation in which the impulse received from the sample, which causes this movement, is relatively slow, on a timescale longer than the settle time of the cantilever 18. That is, any transient motion will have decayed in the time the probe takes to respond to the surface contour. As the tip 20 lowers to contact the surface 44, the cantilever beam 18 is bent downwards and the back of the cantilever 18b is tilted to the left of the Figure. Accordingly, the measuring light beam L is reflected from the back 18b of the cantilever along path 46. The beam exit path is accordingly detected as shifting anticlockwise, as shown by arrow 48. By way of contrast, FIG. 2b illustrates an example of an instantaneous position of the probe 16 when the impulse received from the sample 14 is on a timescale shorter than the settle time of the cantilever 18. As before, the tip 20 is attracted downwards to the surface level 44, but a transient oscillation of the cantilever 18 means that a ripple will be observed along its length. The instantaneous alignment of the probe may therefore be as shown in FIG. 2b. Accordingly, the back of the cantilever 18b will rock about the probe contact point 20a with the sample as the ripple propagates. An instantaneous position at which the back 18b of the cantilever is tilted to the right is shown in FIG. 2b. In this instant, the light beam L is reflected along path 50. The beam exit path is accordingly observed to shift clockwise, as indicated by arrow 52.

Thus it can be seen that despite tracing the same surface position, an instantaneous measurement of probe deflection would produce opposite results in the contrasting situations shown in FIGS. 2a and 2b.

In FIGS. 2c and 2d the position of the sample surface has been raised, as indicated by solid line 54. This surface position 54 is therefore representative of a peak and the tip 20, following the surface, is raised upwards from its nominal position. FIG. 2c illustrates the situation in which the impulse received from the sample, which causes this movement, is relatively slow, on a timescale longer than the settle time of the cantilever 18. That is, any transient motion will have decayed in the time the probe takes to respond to the surface contour. As the tip 20 rises with the surface 54, the cantilever beam 18 is bent upwards and the back of the cantilever 18b is tilted to the right of the Figure. Accordingly, the interrogating light beam L is reflected from the back 18b of the cantilever along path 56. The beam exit path is accordingly observed to shift clockwise, as indicated by arrow 58. Similar to that shown in FIG. 2b, FIG. 2d illustrates an example of an instantaneous position of the probe 16 when the impulse received from the sample 14 is on a timescale shorter than the settle time of the cantilever 18. As in FIG. 2c, the probe tip 20a is raised with the surface level 44, but a transient oscillation of the cantilever 18 means that a ripple will be observed as transient modes propagate along its length. That is, the back of the cantilever 18b will rock about the probe contact point 20a with the surface. Its instantaneous alignment may, for example, be as shown. In the example of FIG. 2d, the back 18b of the cantilever is tilted to the left. In this instant, the light beam L is reflected along path 60. The beam exit path is accordingly observed to shift anticlockwise, as indicated by arrow 62.

Again, measurement of the same surface position 54 is observed to produce contrasting results if transient motion is excited. That is, if the speed at which the probe is scanned across the surface causes the probe to respond to surface features in a time frame that is shorter than the settle time of the cantilever.

The limitation that defines the onset of the third speed regime can be restated as: the pixel collection period (the average time spent imaging that part of the surface that corresponds to one pixel in the image) becomes less than the settle time of the cantilever.

It is to be understood that the positions of the probe 16 shown in FIGS. 2b and 2d are instantaneous. Transient modes will propagate along the cantilever beam 18 and, if undamped, are observed as a rocking of the back 18b of the cantilever and a consequent rapid oscillation of the direction of the reflected beam. If the transient modes are damped, for example by use of a cantilever beam with low Q factor, then the initial tilting movement of the back 18b will settle more quickly.

In PCT patent application WO 2005/008679 a hybrid system is described that is better able to measure the topography of uneven sample surfaces. An improved mechanical system for tracking the tip across the sample surface is implemented in combination with an electronic feedback mechanism. The electronic feedback mechanism is used to make adjustments to the vertical separation of the base of the probe and the sample support, albeit on a timescale greater than the pixel collection rate. In general, these feedback adjustments are made over a period covering multiple scan lines but, within each scan line, variations of the height of the tip above the sample surface must be measured. It is assumed that on the scale of a scan line the sample surface is sufficiently flat that the limitations of the detection system are not too severe. The measured height variations permit an image of surface topography variations to be formed along each scan line and the electronic feedback signals are used to adjust each scan line to a baseline level. The improved mechanical tracking system is necessary in order to keep the tip in better contact with the surface as it encounters irregularities. This permits more accurate height information to be collected within the timescale of each scan line. This prior art device however, although capable of operating within the second speed regime, makes no consideration of transient modes of the cantilever. Although better tracking is provided, which accordingly delays onset of the third regime, such a microscope remains incapable of obtaining accurate results if operating within the third regime.

It is an object of the present invention to provide a detection system for use with a scanning probe microscope that is capable of extracting information relating to the height of a probe tip as it scans a sample surface at speeds in excess of the limit set by a feedback system to maintain a feedback parameter at a predetermined value. In particular, it is an object to provide a detection system that is capable of extracting meaningful information whilst the probe is subject to transient motion.

Accordingly, the present invention provides a detection system for use with a scanning probe microscope, the system comprising a light source for generating a beam to illuminate a probe comprising a cantilever with base and free ends, the free end supporting a sharp tip, collecting means for collecting light reflected from the probe wherein the beam illuminates an upper surface of the probe in the vicinity of its tip, and the reflected light comprises two components: a first component from which an indication of the deflection of the upper surface of the probe is obtained and a second component for transmission to a height detection system arranged to extract from this component information relating to the position of the upper surface of the probe relative to a reference point.

This arrangement has the advantage that the detection system may be used to form an image of the sample surface throughout all three regimes of operation. In the context of this invention "deflection" is not to be understood as limited to the meaning apparent in the prior art described herein. It should instead be understood to include either the angle of orientation or tilt of the upper surface of the probe (as in the prior art) or some other angular measurement derived from the orientation of the cantilever. This may include a measurement derived from the vertical separation between its free and base (or indeed other position on its length) ends. Simply stated the "deflection" of the cantilever should be understood to be some measure of the shape of the bend induced in the cantilever as a result of probe interaction with the sample. Monitoring the deflection of the upper surface of the probe permits feedback to be used to maintain the average interaction force between probe tip and sample constant. This has the effect of limiting possible stresses on the sample and/or probe as a result of an excessively high interaction force being applied. Meanwhile, the path difference measured by the height detection system is a direct measurement of probe height. Regardless of the deflection of the cantilever, this measurement is a true indication of probe height with respect to a position set by the reference point. As this measurement is independent of deflection, it is not influenced by the response time of the feedback system nor, potentially, by the presence of transient motion, which can dynamically alter the deflection of the cantilever but do not affect its height.

As a further consequence of the height measurement being independent of deflection, there is no requirement to have any knowledge of the vertical (z) height of the base of the probe. In prior art AFM systems, the height of the base is measured in order to extract data with which to form the image. In an AFM in accordance with the present invention, the image is formed directly from the interferometer output. Accordingly, whereas in the prior art the input signals to driving system responsible for controlling the vertical height (z) of the base must be calibrated against actual height attained, there is no such calibration requirement in the present invention.

Ideally, the height detection system includes an interferometer arranged to detect the path difference between the second component of reflected light and a height reference beam. Such an interferometer is capable of producing accurate measurements of this optical path difference and hence of the relative height of the probe. Preferably, the interferometer is a homodyne interferometer that includes a means for generating a pair of phase quadrature interferograms, which may be subject to accurate fringe counting techniques over multiple fringes. This improves the accuracy of the height detection system and increases the range of cantilever movement that may be detected. The phase quadrature interferograms may be generated by a beamsplitter with phase-splitting coating.

The first component may also be transmitted to the interferometer, the interferometer being further arranged to detect an optical path difference between the first component of reflected light and a deflection reference beam which propagates along an optical path whose length is defined by a position on the cantilever remote from its free end, and preferably at its base end, thereby providing information as to the tilt of the cantilever. That is, in this instance, the deflection measurement is obtained from the vertical height difference between the free end of the cantilever and a second position along its length, effectively a measure of its average tilt. In this embodiment, the interferometer may be used to extract both height and deflection information, which reduces the number of components required.

Alternatively, the first component may be transmitted to a deflection detector, the deflection detector being arranged to provide the indication of the deflection of the upper surface of the probe. The deflection signal may therefore be obtained using any deflection detector known from the prior art.

Specifically, the deflection detector may be a second interferometer, the second interferometer being arranged to detect an optical path difference between the first component of reflected light and a deflection reference beam which propagates along an optical path whose length is defined by a position on the cantilever remote from its free end, and preferably at its base end. Alternatively, the deflection detector may be a split photodiode oriented such that the first component of reflected light is incident on two parts of the diode with relative intensity determined by the angle of orientation of the upper surface of the probe.

The system may also include a beamsplitter arranged to separate the reflected light into the first and second components referenced above.

The probe preferably comprises a tip mounted near the free end of the cantilever, the cantilever being supported at its base end, and wherein the upper surface of the probe that is illuminated by the beam is above the tip.

The probe may also include an actuator that is operable to move the probe tip. In one embodiment this may be achieved by changing the angle of orientation of the upper surface of the probe in the region of its tip. This actuator is arranged to drive a far smaller load than any drivers that are arranged to move the probe assembly and/or mount vertically. For this reason, it offers the potential for a faster feedback response. Prior art nested feedback systems, which also make use of such an integral actuator, suffer from the disadvantage that interpretation of the feedback loops and therefore determination of the probe height is somewhat complicated. This embodiment of the present invention avoids this as the height of the probe is measured directly, regardless of the position to which any feedback actuator is driven.

In a second aspect the present invention provides a scanning probe microscope for imaging a sample in accordance with an interaction between the sample and a probe, the microscope comprising driving means arranged to provide relative motion between the probe and the sample surface and a probe detection system as described herein.

The driving means preferably comprises an xy scanner arranged to provide relative motion between the probe and the sample surface in a plane substantially parallel to the sample surface and a z driver arranged to provide relative motion in a direction perpendicular to the sample surface. In such an arrangement, the indication of the deflection of the upper surface of the probe obtained from the probe detection system may be included in a feedback system incorporating the z driver, wherein the z driver is arranged to return the deflection of the probe to a set level. The z driver may include a base driver arranged to move the base of the probe and/or an actuator that is integral with the probe and arranged to move the probe tip.

Unlike in prior art AFMs, the feedback system may operate on a timescale longer than that taken by the xy scanner to move the probe between image pixels, without unduly affecting the quality of image recorded by the microscope of this invention.

The xy scanner preferably comprises a resonator arranged to oscillate either the probe plus support or sample plus support at or near its resonant frequency.

In a third aspect the present invention provides a scanning probe microscope for imaging a sample in accordance with an interaction between the sample and a probe, the microscope comprising driving means arranged to provide relative motion between the probe and the sample surface and a probe detection system arranged to provide an indication of a position of the probe relative to a reference point in a direction substantially perpendicular to the sample surface, wherein the probe comprises a cantilever with base and free ends, the free end supporting a sharp tip;

the driving means comprises an xy scanner arranged to provide relative motion between the probe and the sample surface in a plane substantially parallel to the sample surface, the scanner including at least one resonator arranged to oscillate either the probe or sample plus support at or near its resonant frequency, and a z driver arranged to provide relative motion in the direction substantially perpendicular to the sample surface; and the probe detection system comprises a light source for generating a beam to illuminate the probe, collecting means for collecting light reflected from the probe wherein the beam illuminates an upper surface of the probe in the vicinity of its tip, and a height detection system arranged to extract from light reflected from the probe information relating to the position of the upper surface of the probe relative to a reference point.

The height detection system ideally includes an interferometer arranged to detect a path difference between light reflected from the probe and a height reference beam.

In a fourth aspect the present invention provides a method of detecting light reflected from an upper surface of a scanning probe, the method including the step of directing a light beam on the upper surface at a point directly above a probe tip, collecting light reflected from the upper surface and directing it to a height detector arranged to form an image indicative of the height of the probe tip above a reference level.

Ideally, the above method is preceded by a step of locating the point on the upper surface that is directly above the probe tip. This step preferably includes the steps of:
(a) directing light onto the upper surface;
(b) oscillating the probe about its tip so as to change the angle of the upper surface;
(c) monitoring the output of the height detector;
(d) changing the position of the point on the upper surface at which the light is incident; and
(e) repeating steps (c) and (d) until variations apparent in the output of the height detector as a result of tilting the probe are minimised.

This provides a convenient technique with which to minimise the effects of transients on image quality.

The probe preferably comprises a cantilever held at its base end and supporting the tip at or near its free end, the upper surface of the probe that is illuminated by the beam being at or near the cantilever free end.

Alternatively, the step of locating the point on the upper surface may include the steps of:
(a) directing light onto the upper surface of the cantilever
(b) moving the base of the cantilever vertically whilst maintaining the tip in a fixed position so as to change the angle of orientation of the cantilever;
(c) monitoring the output of the height detector;
(d) changing the position of the point on the upper surface at which the light is incident; and
(e) repeating steps (c) and (d) until variations apparent in the output of the height detector as a result of moving the base of the probe are minimised.

In embodiments for which a feedback signal is obtained from an indication of probe orientation, the feedback signal being such as to cause an adjustment of base height such that the probe is returned to a pre-set orientation, then the step of moving the base of the cantilever vertically may be achieved by varying the pre-set orientation.

Alternatively, the step of locating the point on the upper surface may include the steps of:
(a) directing light onto the upper surface;
(b) displacing the probe tip by a known distance, and preferably scanning the probe across a sample of known height variation;
(c) monitoring the output of the height detector;
(d) changing the position of the point on the upper surface at which the light is incident; and
(e) repeating steps (c) and (d) until the output of the height detector corresponds to that expected for the known displacement.

It may alternatively include the steps of:
(a) directing light onto the upper surface;
(b) scanning the probe at a speed sufficient to excite transient motion thereof;
(c) monitoring the output of the height detector;
(d) changing the position of the point on the upper surface at which the light is incident; and
(e) repeating steps (c) and (d) until variations apparent in the output of the height detector as a result of transient motion are minimised.

In a fifth aspect the present invention provides a method of collecting data using a scanning probe microscope, the method comprising the steps of:
(a) moving a probe comprising a cantilever with base and free ends, the free end supporting a sharp tip, into close proximity with a sample surface;
(b) directing a light beam on an upper surface of the probe at a point directly above the tip; and
(c) scanning the probe across the sample surface whilst collecting and analysing light reflected from the upper surface of the probe, a z driver being operative to drive the base of the probe vertically in response to a feedback signal obtained by analysis of a first component of the collected light, from which is obtained an indication of the deflection of the upper surface of the probe and wherein a second component of collected light is transmitted to an interferometer arranged to detect the path difference between this component and a height reference beam and arranged to form an image indicative of the height of the probe tip above a reference level; wherein the response to the feedback signal is over a longer timescale than that in which multiple image pixels are collected.

Embodiments of the invention will now be described by way of example only and with reference to the accompanying drawings.

Figure 3:
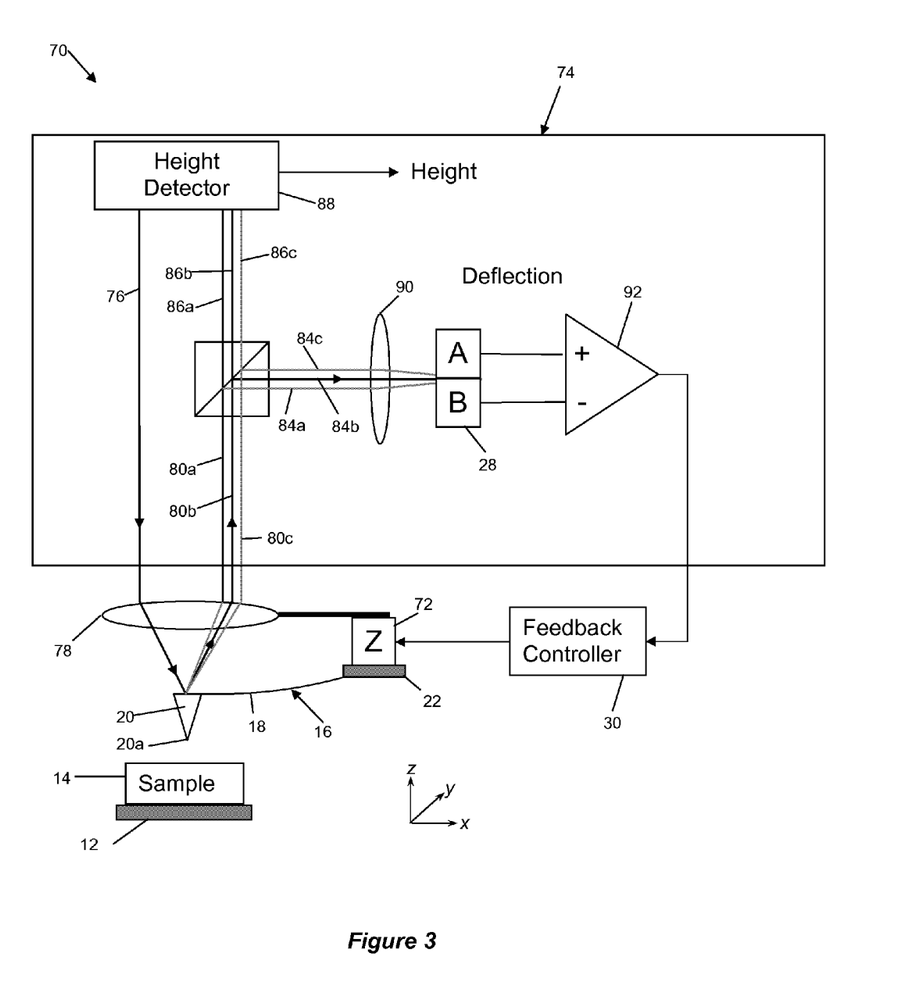
FIG. 3 is a schematic illustration of the components of an atomic force microscope with probe detection system in accordance with the present invention.

With reference to FIG. 3 there is shown schematically an implementation of an AFM, indicated generally by 70, that utilises a first embodiment of a detector constructed in accordance with an aspect of the present invention. Elements common to the prior art AFM described previously with reference to FIG. 1 are given the same reference signs. Accordingly, the AFM apparatus shown comprises a moveable stage 12 adapted to receive a sample 14, whose surface is to be investigated by a probe 16. The probe 16 comprises a cantilever beam 18 and a tip 20, which tapers to a point 20a, and which is located towards one end of the cantilever beam 18. The other end of the cantilever beam 18 is supported by a mount 22.

One or more drive motors (72, not shown) are used to drive the sample 14 (together with the stage 12) and/or the probe 16 such that they can be scanned relative to each other in three dimensions: x, y and z directions. As is conventional in the field, the z axis of a Cartesian coordinate system will be taken to be that perpendicular to a plane occupied by the sample 14. That is, the strength of the interaction force between probe 16 and sample 14 is dependent both on the xy position of the tip 20 over the sample 14 (the pixel it is imaging), and also on its height above it.

Of the various drive motors, a z-positioning system 72 is the most important for the purposes of this invention. The z-positioning system 72 comprises piezoelectric drivers that are operable to move the tip 20 towards and away from (z-direction) the sample 14. In this embodiment, the z-positioning system is connected to the probe mount 22. Alternatively, it may be connected to the sample stage 12 (as shown in FIG. 1) and it may comprise non-piezoelectric driving mechanisms such as a voice coil or thermal bimorph actuator. Further motors are connected to either the mount 22, the stage 12 or to both and are operable to provide relative motion between the sample 14 and tip 20 in the plane (x,y) of the sample, such that the tip 20 is scanned raster fashion, or otherwise, over the sample 14.

In one embodiment the z-positioning system may include both the stage (or mount) driver, as described above, and an additional actuator that is integral with the probe itself. This integral actuator may be used to drive the probe deflection with a faster feedback response than possible with the assembly driver.

The probe 16 is a low-mass AFM probe and, during a scan, an interaction force is developed between the tip 20 and the sample surface. A probe detection mechanism 74, which will be explained in more detail below, is arranged to obtain an indication of both the vertical (z) displacement of a point 18b at the back of the cantilever above the tip 20 and its deflection (tilt). Data relating to the vertical displacement is analysed and output to a display (not shown). Information relating to the tilt/deflection of the back 18b of the cantilever is input to a feedback controller 30, which in turn is connected to the drive mechanism of the z-positioning system 72.

Note that, for convenience, the description "vertical" is applied to motion in the microscope system z direction. As is clear from previous comments this is not intended to limit to situations in which the microscope z axis is aligned vertically. The microscope can be placed in any convenient orientation, as suits the purpose.

The probe 16 is generally (for AFM) fabricated from silicon or silicon nitride and formed to a shape and size as described previously in relation to the prior art.

In taking an image of the sample, the AFM 70 operates as follows. Using the z-positioning system 72 and further drivers, the sample 14 is first brought into contact with the tip 20 at the start position of the raster (x,y) scan. Conventionally, in AFM terminology, the tip 20 is said to be in contact with the sample 14 when the atomic interaction force is in the repulsive regime. Once the probe 16 makes contact with the sample surface, the tip 20 is therefore pushed upwards. The base of the cantilever 18, at the side remote from the tip, is held in position by the mount 22 and so the cantilever 18 is bent or deflected upwards. As is conventional, and as described in relation to the prior art, the mount 22 is lowered, moving the probe 16 towards the sample 14 until the cantilever bend reaches a predetermined level. This predetermined level is the set point for the feedback controller 30.

As the scan progresses, the tip 20 moves up and down as sample surface height varies. As it moves, the degree of tilt is changed, which alters the signal fed to the feedback controller 30 and the z-positioning system 72 is adjusted. As the base of the probe is adjusted in response to feedback then the following considerations apply. As the tip moves with a velocity v across the sample, it tracks the sample surface and so encounters surface height variations at a rate $f_{track}$, which is proportional to v. Transient motion will be excited in the cantilever with a decay or settle time τ. The response time of the feedback system is the time taken by the feedback system to detect a change in the feedback parameter and adjust probe base height accordingly.

Three scanning speed regimes can be identified:

If the response time of the feedback system is less than the time interval between data collection points then the feedback system has sufficient time to adjust probe height whilst the probe gathers data relating to surface height at a single image point. That is, for all image points, the probe can be considered to be at constant deflection and hence the interaction force between probe and sample can also be considered constant. This is the first speed regime, within which prior art systems using feedback are capable of extracting accurate surface information. The apparatus of this invention however differs from the prior art in that information relating to the height of the probe is obtained directly by the detection system 74.

If the response time of the feedback system is greater than the time interval between data collection points then feedback only serves to maintain a constant average deflection. In this second regime, tip velocity is such that surface variations are tracked at a higher frequency than can be accommodated by the response time of the feedback system and such variations must therefore be measured directly by the probe height detection system. The feedback signal is used to maintain constant average deflection, which mitigates against the probe experiencing extremes of interaction strength, which may cause damage to the probe, sample or both.

In the third scanning regime, the settle time of the cantilever is greater than the time interval between data collection points and any transient motion excited in the cantilever will not have decayed before the probe moves on to image subsequent areas of the sample. The height detection system of the present invention is however capable of extracting a measurement of probe height in the presence of such motion. This in turn gives an indication of sample height, providing that the tip maintains contact with the sample.

These regimes are given broad definitions, and the onset of each clearly depends on the particular operating conditions and parameters of the microscope and sample under investigation.

The operation of the detection system 74 in accordance with the present invention will now be described in more detail. A light source (not shown) emits a laser beam 76 that is focused by objective lens 78 onto the back 18b of the cantilever. Reflected light 80a, b, c is collected by the lens 78 and directed towards a non-polarising beamsplitter 82. As can be seen from FIG. 3, the tilt of the cantilever 18b affects the angle at which light is reflected. If the probe is maintained at its set feedback position, the reflected beam follows path 80b. If however, the cantilever back 18b is tilted leftwards (relative to the figure) the reflected beam 80a will be deflected anticlockwise and a rightwards tilt will deflect the reflected beam 80c clockwise. As the back 18b of the cantilever is located at or near the focal point of the lens 78, an angular variation in the reflected beam is converted to a lateral displacement after the lens. That is, a leftwards tilt of the cantilever produces a leftwards lateral displacement of the reflected beam and a rightwards tilt generates a rightwards displacement relative to the set feedback position.

The beamsplitter 82 is arranged such that it reflects through 90° substantially half 84a, b, c the light incident on it and transmits the other half 86a, b, c. The transmitted component 86a, b, c is input to an interferometer 88. The operation of this interferometer will be described in more detail with reference to FIG. 5. In summary though, the reflected beam 86a, b, c is interfered with a reference beam reflected from the upper surface of the stage 12. Alternatively, another fixed point with known relationship to the stage surface may be used. This provides a measure of the path difference between the two beams and hence an indication of the height of the back 18b of the cantilever above the stage surface. Variations of this measured height are extracted to form an image.

The components 84a, b, c reflected from the beamsplitter 82 are condensed by lens 90 onto a deflection detector 28. As in the prior art, detector 28 is split across its length into independent detector areas A and B. The output signals generated from these areas are input to a difference amplifier 92, which outputs a signal equal to the difference between the two channels. The detector 28 is aligned with the collection optics such that when the cantilever back 18b is tilted to its set deflection position, then the output from the difference amplifier will also be at its set point. That is, the reflected light 80b, 84b is distributed between channels A and B such that the difference in channel output is a set value. A leftwards tilt of the back 18b of the cantilever means that the signal from the detector 28 increases in channel B, leading to a fall in output from the difference amplifier 92. Conversely, a rightwards tilt means that channel A receives the signal increase and a rise in output is generated by the difference amplifier 92. The feedback controller 30 operates the z-positioning system 72 in order to maintain the signal received from the difference amplifier 92 at its set point.

Independently of the feedback signal, or equivalently deflection of the cantilever, the true probe height above the surface is measured by the interferometric height detection system. The feedback system is accordingly used to ensure that the average deflection is maintained at a constant level.

It is important that the light 76 of the detection system is focused on the back 18*b* of the cantilever. For this reason, the z-positioning system is also connected to the objective lens 78 and arranged such that if the probe 16 is raised or lowered, the lens 78 is raised or lowered by an equal amount. In an alternative embodiment, the objective lens 78 is selected to have a depth of focus greater than the range of movement expected from the tip. There is accordingly no need to adjust the position of the objective with respect to the tip 20.

It is to be noted that although this invention is described in relation to FIG. 3, which illustrates an atomic force microscope, it can be seen that this detection system can be used for all scanning probe microscopes, in which it is important to determine accurately the height of a probe tip.

In further embodiments the (x,y) scanning drive mechanisms (not shown in the Figure) and the z-positioning system 72 can be replaced by any suitable driving means, which may not be piezoelectric. The drivers may be attached to the sample stage 12, probe mount 22 or a combination of both.

The deflection detector 28 described above may be replaced by alternative known means of measuring deflection of the cantilever 18. For example, the cantilever may be formed with integrated piezo-resistive sensors. A height detection system similar to that used to measure the height of the cantilever may also be used to measure deflection. That is, an interferometer is used to measure the height of the tip 20 relative to the height of the base of the cantilever.

The light source used with this embodiment is a laser source, but alternative sources are available. For interferometric detection the light should be coherent, to a degree required by the specifics of the interferometer.

Transient motion of the cantilever provides a fundamental limitation to the speed at which feedback can be implemented. The cantilever must be permitted to settle during the time taken by the feedback system to measure and adjust deflection. Otherwise, transient motion will produce incorrect deflection information. Different methods of measuring deflection accordingly place slightly different limitations on the feedback control system. When measuring deflection using cantilever angle, the response time of the feedback control system must be greater than the settle time of the constrained cantilever. If using a height detection system (such as the interferometer referred to above) however then the response time of the feedback control system is only limited by the resonant frequency of the unconstrained cantilever.

Figure 4:
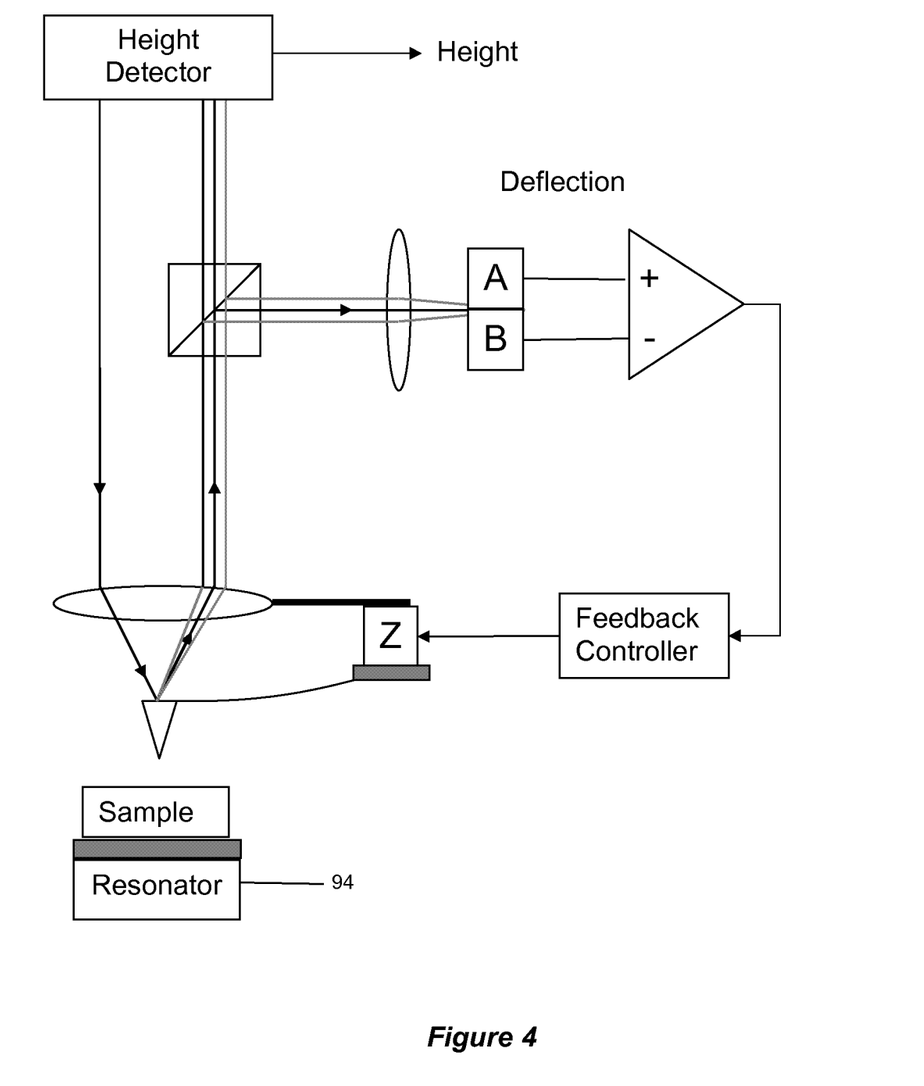
FIG. 4 is a schematic illustration of the probe detection system in accordance with the present invention incorporated in a high speed scanning probe microscope.

An alternative AFM apparatus, which is particularly suited to use with the detection system of this invention, is shown in FIG. 4. In this Figure one or both of the (x,y) scanning drive mechanisms is replaced with a resonator 94. The resonator 94 is an oscillating drive set to oscillate the sample stage at or near its resonant frequency. Such resonant scanning microscopes provide a very fast and stable scanning capability, which can easily be above the threshold limit for operating in constant interaction mode. Alternatively, the resonator 94 may be set to oscillate the probe assembly at or near its resonant frequency.

Figure 5:
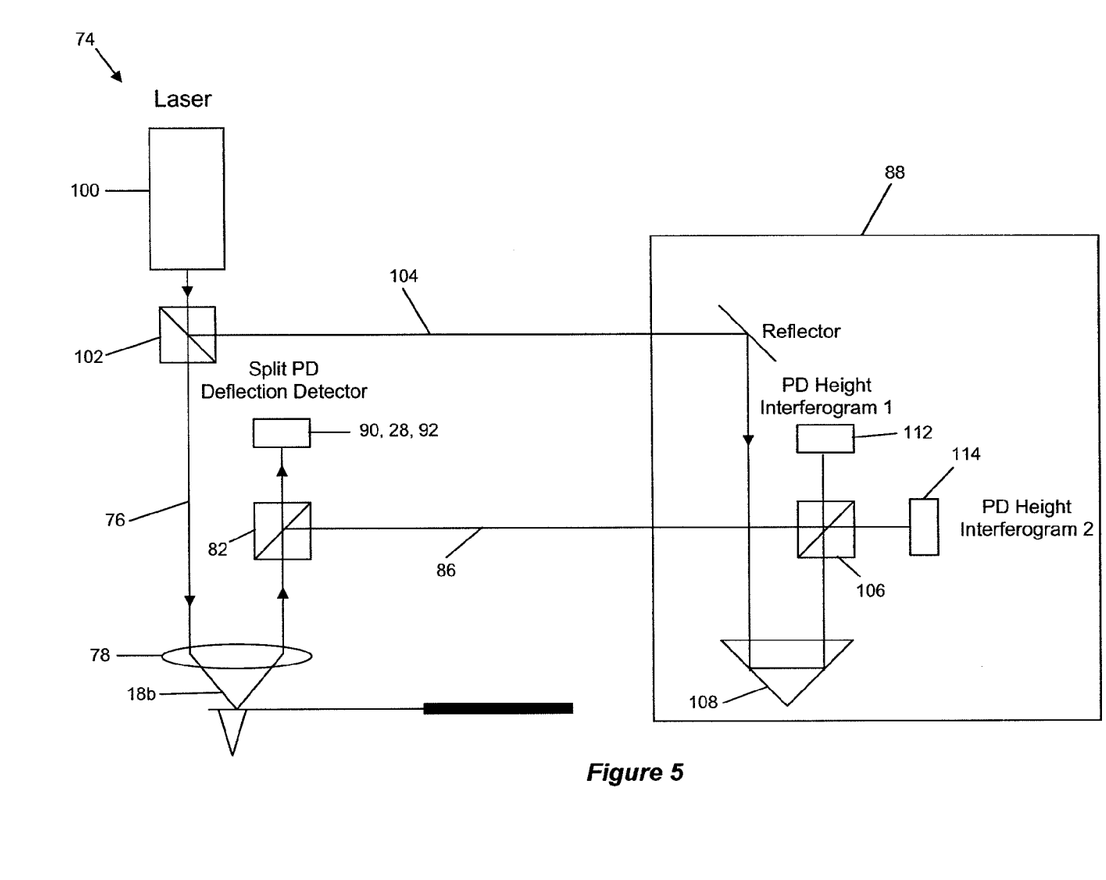
FIG. 5 is a schematic illustration of an interferometric height detection system for use with the present invention.

With reference to FIG. 5, there is shown in further detail the optical components of the detection system 74. As in previous figures, common components are like referenced. Light from a laser source 100 is split by a second 102 beam splitter into the incident beam 76 and a reference beam 104. The incident beam 76 is focused by the objective lens 78 on the back 18*b* of the cantilever. After reflection from the cantilever, the beam 80 is split by the first 82 beam splitter. As described previously, the first component 84 is directed to the deflection detector 90, 28, 92 and the second component 86 to the interferometer 88.

Inside the interferometer, the beam 86 that has been reflected from the cantilever 18*b* is split by a beam splitter 106. The reference beam 104 is directed onto a suitably positioned retroreflector 108 and thereafter to the beam splitter 106. The retroreflector 108 is aligned such that it provides a fixed optical path length relative to the vertical (z) position of the sample. The beamsplitter 106 has an energy absorbing coating and splits both incident 86 and reference 104 beams to produce first and second interferograms with a relative phase shift of ~90°. The two interferograms are detected respectively at first 112 and second 114 photodetectors.

Ideally, the photodetector signals are complementary sine and cosine signals with a phase difference of 90°. Further, they should have no dc offset, have equal amplitudes and only depend on the position of the cantilever x and wavelength $\lambda$ of the laser. Known methods are used to monitor the photodetector 112, 114 outputs while changing the optical path difference in order to determine and to apply corrections for errors arising as a result of the two photodetector signals not being perfectly harmonic with equal amplitude and in phase quadrature. Similarly, dc offset levels are also corrected in accordance with methods known in the art.

These photodetector signals are suitable for use with a conventional interferometer reversible fringe counting apparatus and fringe subdividing apparatus, which may be provided as dedicated hardware or as a programmed computer. The use of phase quadrature fringe counting apparatus is capable of measuring displacements in the position of the cantilever to an accuracy of $\lambda/8$. That is to 66 nm for 532 nm light. Known fringe subdividing techniques, based on the arc tangent of the signals, permits an improvement in the accuracy to the nanometer scale or less.

Interferometric methods of extracting the path difference between two coherent beams are well known in the art and so will not be described in any further detail.

In the embodiment described above, the reference beam is arranged to have a fixed optical path length relative to the z position of the sample. It could accordingly be reflected from the surface of the stage on which the sample is mounted or from a retroreflector whose position is linked to that of the stage, as described above. Alternatively, the relationship between reflector and sample z position does not have to be fixed. In such an embodiment the reference beam may be reflected from a fixed point, the fixed point having a known (but varying) relationship with the z position of the sample. The height of the tip is therefore deduced from the interferometrically-measured path difference and the z position of the sample with respect to the fixed point.

The interferometer described herein is one example of a homodyne system. The particular system described offers a number of advantages to this application. The use of two phase quadrature interferograms enables the measurement of cantilever displacement over multiple fringes, and hence over a larger displacement range. The use of a phase-shifting coating on the beamsplitter 106 renders the interferometer insensitive to polarisation effects, for example arising from changes in polarisation as the light beam is reflected from the cantilever. An example of an interferometer based on these principles is described in U.S. Pat. No. 6,678,056. Alternative interferometer systems capable of measuring a change in optical path length may also be employed with this invention. A suitable homodyne polarisation interferometer is described in the above referenced EP 1 892 727 and a suitable heterodyne interferometer is described in the above referenced U.S. Pat. No. 5,144,150.

It is clear that the above-described AFM is capable of operating in the second scanning speed regime. The height information extracted by the detection system represents the true height of the probe and hence of sample surface topography. This is independent of the position of the base of the probe relative to the tip i.e. of the deflection. Accordingly, although the deflection is permitted to vary about its average value during the course of a scan, this is separate to the height measurement by interferometry.

When moving to the third scanning speed regime however, an additional step must be included when preparing the AFM of this invention for operation. It has already been shown with reference to FIG. 2 that if transient motion is excited in the cantilever then this is manifest as a rocking motion of the back 18b of the cantilever. In order to avoid seeing these effects as artefacts in the height image, it is important that the interrogating laser beam 76 of the detection system is focused onto the node of this motion. That is, to a position above the point 20a of the tip. This can be achieved empirically, by monitoring the output image and adjusting the detection position of the incident beam 76 until the periodic variations overlaid on the image are minimised, or even disappear. That is, before or as the apparatus 70 is used to extract data at a scanning speed within the third regime, the probe and interferometer must be set to the correct alignment.

Figure 6:
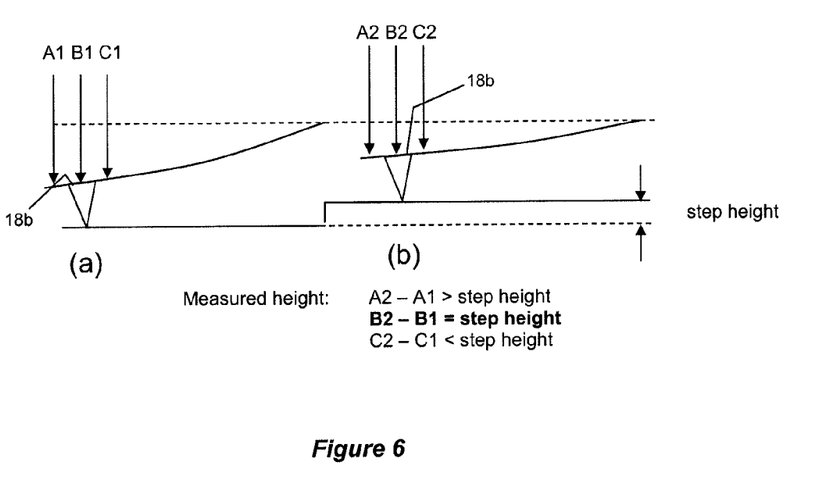
FIG. 6 is a schematic illustration of the effect of varying the point on the back of the cantilever at which height is measured.

A second reason as to why the position at which the interrogating beam is incident on the back of the laser beam is important will be shown with reference to FIG. 6. This Figure shows three possible laser beam incident positions on the back 18b of the cantilever. In situation (a), the probe 16 is in one orientation and in situation (b), it has followed a step in the sample surface to a second orientation. If the laser beam is aligned to position A, to the right of the probe tip 20, then it is clear that the measured height change A2−A1 is greater than the step height, as the deflection is at a shallower angle in situation (b). Conversely, if the beam is aligned to position C, the measured change C2−C1 is less than the true step height. A true measure of step height can only be obtained if the laser beam is accurately aligned to position B: above the closest point of contact between tip 20 and sample 14. That is, it is important to align the interferometer accurately with the probe geometry.

Both the true height issue and that of the effect of transients can be addressed by the same methods, as they are essentially overcome by positioning the incident beam directly above the point of the tip. It is to be noted that the true height issue applies to both the second and third scanning speed regimes; it arises as a consequence of permitting the tilt/deflection of the cantilever to vary as interferometric height information is extracted. Accordingly, in order to obtain the most accurate image information, the step of aligning the height detection system with the probe geometry should be taken for scanning speed regimes in which the tilt/deflection of the cantilever is permitted to vary.

As indicated above, alignment may be achieved empirically at fast scanning speeds, either before or during the course of a scan, in which transients are excited. Alternatively, an alignment system illustrated in FIG. 7 can be used.

Figure 7:
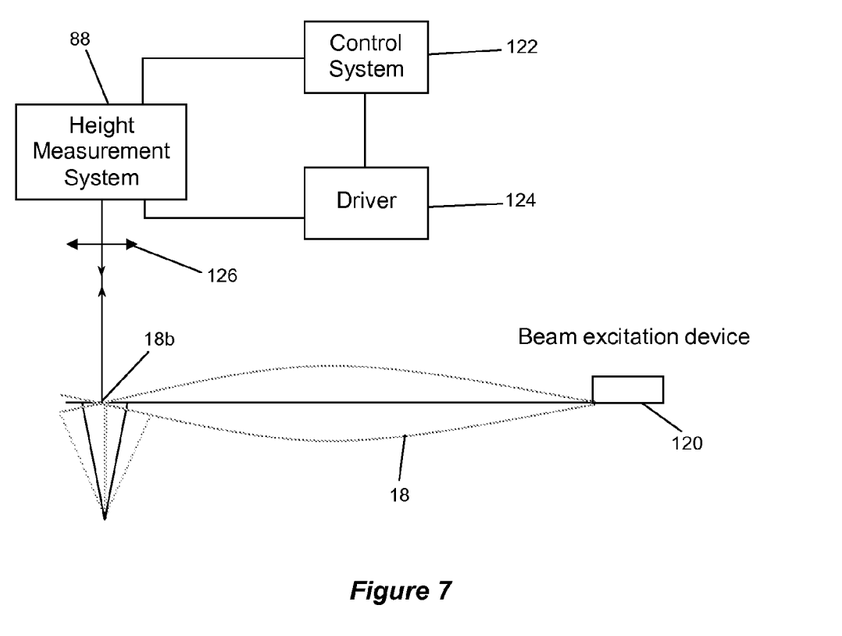
FIG. 7 is a schematic illustration of apparatus used to align the detection system of the present invention in preparation for carrying out a scan of a sample surface.

In this system a beam excitation device 120 is set to excite oscillations in the cantilever beam 18. The back 18b of the cantilever will accordingly oscillate or rock, the effect of which can be observed in light reflecting from this surface 18b as periodic signal variations in the deflection and height detection systems. In the embodiment shown, a control system 122 is set to monitor the output of the height detection system 88. If a periodic variation in this output signal is observed as the cantilever oscillates, then the control system 122 sends a signal to one or more drivers 124, which in turn move the detection point (at which the light is incident on the back 18b of the cantilever) laterally. Adjustment of the detection point continues until the effects of the rocking are minimised in the height detection signal.

In the embodiment of FIG. 7, the driver 124 is shown connected to the height detection system 88 and accordingly is operable to move the alignment of the light, as indicated by arrows 126, incident on the back 18b of the cantilever such that the detection point is shifted. Alternatively, the driver or drivers 124 are connected to the probe itself, and arranged to move the probe laterally under direction from the control system 122 and so to shift the detection point in this manner. That is, the detection point is adjusted either by moving the probe or the alignment of light incident on the probe.

Oscillations of the cantilever 18, and hence the rocking of its back 18b, are generated by a known beam oscillation device 120 such as a piezoelectric transducer. Alternatively, the cantilever 18 can be adapted to be sensitive to electric or magnetic fields. Oscillations can then be generated by means of oscillating electric or magnetic fields, to which the cantilever 18 mechanically responds.

An alternative method of setting the detection point is to change the height of the base of the cantilever while monitoring the height detection signal. The detection point on the back 18b of the cantilever can then be adjusted to minimise variations in the height detection signal resulting in changes in the height of the base of the cantilever. The base height may be adjusted by a variety of mechanisms but one advantageous technique is to vary the feedback set point. This will cause the vertical separation between the base of the cantilever and the sample to change until the new set point value is achieved. This method has the advantage of allowing control of the maximum and minimum force applied between sample and tip.

A further alternative is to displace the tip of the cantilever by a known vertical distance, for example by scanning a sample with a known height variation such as a standard step sample. The position of the detection point on the back 18b of the cantilever is then adjusted until the height detection signal indicates the correct displacement or height variation.

It is generally preferred to locate the position of the back 18b of the cantilever directly above the point 20a of the tip empirically, rather than geometrically from the probe itself. This is because there is always some uncertainty in tip position using current probe fabrication methods. Of course, once tip position for a particular probe has been located by an empirical technique, such as those described above, it is possible to record it and so avoid the need for repeated empirical determinations for subsequent uses of the same probe.

This feature of the invention is particularly suited to use with resonant scanning microscopes such as those described in WO 2004/005844 in which at least one component of the raster scan is carried out rapidly by oscillating the probe (or, equivalently, sample and stage) at resonance. Such a scanning speed is highly likely to excite transient motion of the cantilever, which would obscure the image collected by prior art detection systems.

The invention claimed is:

1. A detection system for use with a scanning probe microscope, the system comprising a light source for generating a beam to illuminate a probe comprising a cantilever with base and free ends, the free end supporting a sharp tip, collecting means for collecting light reflected from the probe wherein the beam illuminates an upper surface of the probe in the vicinity of its tip, and the reflected light comprises two components: a first component from which an indication of the deflection of the upper surface of the probe is obtained and a second component for transmission to a height detection system arranged to extract from this component information relating to the position of the upper surface of the probe relative to a reference point.

2. A detection system according to claim 1 wherein the height detection system comprises an interferometer arranged to detect the path difference between the second component of reflected light and a height reference beam.

3. A detection system according to claim 2 wherein the interferometer includes a means for generating a pair of phase quadrature interferograms.

4. A detection system according to claim 3 wherein the system includes fringe counting apparatus arranged to produce an output dependent on a number of fringes detected at each interferogram.

5. A detection system according to claim 4 wherein the fringe counting apparatus includes fringe subdividing apparatus.

6. A detection system according to claim 3 wherein the means for generating a pair of phase quadrature interferograms is a beamsplitter with phase-splitting coating.

7. A detection system according to claim 2 wherein the first component is also transmitted to the interferometer, the interferometer being further arranged to detect an optical path difference between the first component of reflected light and a deflection reference beam which propagates along an optical path whose length is defined by a position on the cantilever remote from its free end, thereby providing information as to the deflection of the cantilever.

8. A detection system according to claim 7 wherein the position on the cantilever remote from its free end is the cantilever base end.

9. A detection system according to claim 1 wherein the first component is transmitted to a deflection detector, the deflection detector being arranged to provide the indication of the deflection of the upper surface of the probe.

10. A detection system according to claim 9 wherein the deflection detector is a second interferometer, the second interferometer being arranged to detect an optical path difference between the first component of reflected light and a deflection reference beam which propagates along an optical path whose length is defined by a position on the cantilever remote from its free end.

11. A detection system according to claim 10 wherein the position on the cantilever remote from its free end is the cantilever base end.

12. A detection system according to claim 9 wherein the deflection detector is a split photodiode oriented such that the first component of reflected light is incident on two parts of the diode with relative intensity determined by an angle of orientation of the upper surface of the probe.

13. A detection system according to claim 1 the system including a beamsplitter arranged to separate the reflected light into the first and second components.

14. A detection system according to claim 1 wherein the probe comprises a tip mounted near the free end of the cantilever, the cantilever being supported at its base end, and wherein the upper surface of the probe that is illuminated by the beam is above the tip.

15. A detection system according to claim 1 wherein the probe includes an actuator that is operable to move its tip.

16. A scanning probe microscope for imaging a sample in accordance with an interaction between the sample and a probe, the microscope comprising driving means arranged to provide relative motion between the probe and the sample surface and a probe detection system in accordance with claim 1.

17. A scanning probe microscope in accordance with claim 16 wherein the driving means comprises an xy scanner arranged to provide relative motion between the probe and the sample surface in a plane substantially parallel to the sample surface and a z driver arranged to provide relative motion in a direction perpendicular to the sample surface.

18. A scanning probe microscope in accordance with claim 17 wherein the indication of the deflection of the upper surface of the probe obtained from the probe detection system is included in a feedback system incorporating the z driver, wherein the z driver is arranged to return the indication of the angle of orientation of the probe to a set level.

19. A scanning probe microscope in accordance with claim 18 wherein the z driver includes a base driver that is arranged to move the base of the probe.

20. A scanning probe microscope in accordance with claim 19 wherein the z driver also includes an actuator that is integral with the probe, the actuator being operable to move the tip of the probe.

21. A scanning probe microscope in accordance with claim 18 wherein the feedback system operates on a timescale longer than that taken by the xy scanner to move the probe between image pixels.

22. A scanning probe microscope according to claim 18 wherein the xy scanner comprises a resonator arranged to oscillate either the probe or sample plus support at or near its resonant frequency.

23. A method of detecting light reflected from an upper surface of a scanning probe, the method including locating a point on the upper surface that is directly above the probe tip followed by directing a light beam on the upper surface at a point directly above a probe tip, collecting light reflected from the upper surface and directing it to a height detector arranged to form an image indicative of the height of the probe tip above a reference level. wherein the step of locating the point on the upper surface includes the steps of:
  (a) directing light onto the upper surface;
  (b) oscillating the probe about its tip so as to change the angle of the upper surface;
  (c) monitoring the output of the height detector;
  (d) changing the position of the point on the upper surface at which the light is incident; and
  (e) repeating steps (c) and (d) until variations apparent in the output of the height detector as a result of tilting the probe are minimised.

24. A method of detecting light reflected from an upper surface of a scanning probe, the method including locating a point on the upper surface that is directly above the probe tip followed by directing a light beam on the upper surface at a point directly above a probe tip, collecting light reflected from the upper surface and directing it to a height detector arranged to form an image indicative of the height of the probe tip above a reference level, wherein the probe comprises a cantilever held at its base end and supporting the tip at or near its free end, the upper surface of the probe that is illuminated by the beam being at or near the cantilever free end, and wherein the step of locating the point on the upper surface includes the steps of:
- (a) directing light onto the upper surface of the cantilever
- (b) moving the base of the cantilever vertically whilst maintaining the tip in a fixed position so as to change the angle of orientation of the cantilever;
- (c) monitoring the output of the height detector;
- (d) changing the position of the point on the upper surface at which the light is incident; and
- (e) repeating steps (c) and (d) until variations apparent in the output of the height detector as a result of moving the base of the probe are minimised.

25. A method according to claim 24 wherein a feedback signal is obtained from an indication of probe orientation, the feedback signal being such as to cause an adjustment of base height such that the probe is returned to a pre-set orientation and wherein the step of moving the base of the cantilever vertically is achieved by varying the pre-set orientation.

26. A method of detecting light reflected from an upper surface of a scanning probe, the method including locating a point on the upper surface that is directly above the probe tip followed by a step of directing a light beam on the upper surface at a point directly above a probe tip, collecting light reflected from the upper surface and directing it to a height detector arranged to form an image indicative of the height of the probe tip above a reference level, and wherein the step of locating the point on the upper surface includes the steps of:
- (a) directing light onto the upper surface;
- (b) displacing the probe tip by a known distance;
- (c) monitoring the output of the height detector;
- (d) changing the position of the point on the upper surface at which the light is incident; and
- repeating steps (c) and (d) until the output of the height detector corresponds to that expected for the known displacement.

27. A method according to claim 26 wherein Step (b) comprises scanning the probe across a sample of known height variation.

28. A method of detecting light reflected from an upper surface of a scanning probe, the method including locating a point on the upper surface that is directly above the probe tip followed by a step of directing a light beam on the upper surface at a point directly above a probe tip, collecting light reflected from the upper surface and directing it to a height detector arranged to form an image indicative of the height of the probe tip above a reference level, wherein the step of locating the point on the upper surface includes the steps of:
- (a) directing light onto the upper surface;
- (b) scanning the probe at a speed sufficient to excite transient motion thereof;
- (c) monitoring the output of the height detector;
- (d) changing the position of the point on the upper surface at which the light is incident; and
- (e) repeating steps (c) and (d) until variations apparent in the output of the height detector as a result of transient motion are minimised.

29. A method of detecting light reflected from an upper surface of a scanning probe, the method including the step of directing a light beam on the upper surface at a point directly above a probe tip, collecting light reflected from the upper surface and directing it to a height detector arranged to form an image indicative of the height of the probe tip above a reference level, wherein the scanning probe comprises a cantilever with a base and a free end, the free end supporting a sharp tip, and is part of a scanning probe microscope that incorporates a detection system comprising a light source for generating the light beam to illuminate the scanning probe, and a collecting means for collecting light reflected from the scanning probe, wherein the reflected light comprises two components: a first component from which an indication of a deflection of the upper surface of the scanning probe is obtained and a second component for directing to the height detector.

30. A method of collecting data using a scanning probe microscope, the method comprising the steps of:
- (a) moving a probe comprising a cantilever with base and free ends, the free end supporting a sharp tip, into close proximity with a sample surface;
- (b) directing a light beam on an upper surface of the probe at a point directly above the tip; and
- (c) scanning the probe across the sample surface whilst collecting and analysing light reflected from the upper surface of the probe, a z driver being operative to drive the base of the probe vertically in response to a feedback signal obtained by analysis of a first component of the collected light, from which is obtained an indication of the deflection of the upper surface of the probe and wherein a second component of collected light is transmitted to an interferometer arranged to detect the path difference between this component and a height reference beam and arranged to form an image indicative of the height of the probe tip above a reference level.

* * * * *